(12) United States Patent
Peet et al.

(10) Patent No.: US 7,469,906 B2
(45) Date of Patent: Dec. 30, 2008

(54) FILTER LIP SEAL AND METHOD

(75) Inventors: C. Alan Peet, Waterman, IL (US); Igor Markov, Arlington Heights, IL (US); Ibrahim Khalil, Lake Barrington, IL (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/171,185

(22) Filed: Jul. 1, 2005

(65) Prior Publication Data

US 2007/0001402 A1    Jan. 4, 2007

(51) Int. Cl.
*F16J 15/02* (2006.01)
(52) U.S. Cl. ............................ 277/651; 277/637
(58) Field of Classification Search ......... 277/377–386, 277/616, 618, 619, 624, 626, 627, 637, 644, 277/648, 649, 651
See application file for complete search history.

(56) References Cited

U.S. PATENT DOCUMENTS

| | | | | |
|---|---|---|---|---|
| 1,969,008 A | * | 8/1934 | Hubbard | 277/530 |
| 2,797,944 A | * | 7/1957 | Riesing | 277/573 |
| 3,445,120 A | * | 5/1969 | Barr | 277/625 |
| 4,120,521 A | * | 10/1978 | Parmann | 285/113 |
| 4,322,175 A | * | 3/1982 | Szczesny | 403/134 |
| 4,387,900 A | | 6/1983 | Ditcher et al. | |
| 4,614,371 A | * | 9/1986 | Bauder | 285/231 |
| 6,406,029 B1 | | 6/2002 | Kupper et al. | 277/383 |

* cited by examiner

*Primary Examiner*—Patricia L Engle
*Assistant Examiner*—Gilbert Y Lee
(74) *Attorney, Agent, or Firm*—Baker & Hostetler LLP

(57) ABSTRACT

A lip seal has an internal spring element disposed in an elastomeric ring. The spring element has a central ring with inwardly directed angled fingers

30 Claims, 3 Drawing Sheets

FILTER LIP SEAL AND METHOD

FIELD OF THE INVENTION

The present invention relates generally to the field of resilient seals, and more particularly pertains to the sealing of the an item, such as for example a transmission filter having a neck, within a bore of a piece of machinery, such as for example a transmission. More particularly, the invention in some aspects pertains to a seal referred to as a "lip seal".

BACKGROUND OF THE INVENTION

There are wide variety of circumstances in which a compressible resilient lip seal is desired. One of these applications is the connection of a fluid filter, such as for example a transmission filter, with respect to a bore or orifice in a device such as for example a vehicular transmission. In the case of a transmission filter, the filter typically has a neck extending from the filter, which typically provides either the inlet or outlet of fluid with respect to the filter casing. This neck is typically inserted into a bore or socket that is part of the transmission or a transmission component to provide fluid communication between the filter and the transmission or transmission component. For example, the neck of the filter may be put into fluid communication with a pump inlet, a valve body, or a case casting that leads to a pump inlet.

In order to provide a seal between the filter neck and the inlet bore, it has been known to provide an elastic resilient sealing ring, or "lip seal", which surrounds the outside of the filter neck, and sealingly fits within the bore.

A transmission filter is typically installed into the transmission during original equipment manufacture of the transmission, and may eventually be replaced by a service technician. During such an installation process, the filter neck with the resilient seal already on it is typically manually inserted in the fluid inlet bore of the transmission or transmission component. Typically, the sealing ring is inserted onto the filter neck either during assembly of the filter or at some other stage prior to insertion of the filter neck into the transmission bore. It will be appreciated that during this installation phase it is desirable to retain the sealing ring at a desired location on the neck (i.e., to prevent the seal from sliding or rolling down the neck) while also permitting the sealing ring to slide into the bore while still being compressed enough to maintain a seal between the filter neck and the bore once installed.

Various methods have been employed in order to retain the seal in its proper location on the filter neck during the installation phase. For example, the seal typically has an inner diameter when relaxed that is slightly less then the outer diameter of the location at the neck where it will be placed, so that the seal is frictionally gripping the neck. Further, a shoulder is sometimes provided on the neck to meet the edge of the seal which resists movement of the seal along the neck during the insertion phase.

During the life of a transmission, however, the filter may sometimes need to be replaced. During this replacement servicing, the filter neck is typically manually withdrawn out of the inlet bore and the filter is discarded and replaced with a new filter that is inserted in much the same fashion that is described above. This filter removal step has presented several challenges with respect to the lip seal. Oftentimes, when the filter is manually removed, the lip seal tends to slide off the neck and stay within the inlet. This problem is exacerbated by the fact that the outside of a filter neck is typically very smooth, due to the fact that the filter neck is usually an injection molded part. The inlet bore, on the other hand, tends to be a more roughly machined surface. The problem of the lip seal frictionally being left behind in the inlet, after sliding off the filter neck is also driven in part by the fact that the filter neck, which is usually an injection molded plastic part, tends to shrink due to the heat cycles experienced during its life. Some efforts at alleviating this problem have involved roughing or providing ribs or other features on the outside of the filter neck in order to help engage the lip seal during removal. This solution is not always desirable, however, as it can cause extra efforts or difficulties with respect to the injection molding process for the filter casing itself. The occurrence of the lip seal sliding off the filter neck during filter removal and being left behind in the inlet bore can have some adverse consequences. For example, the servicing technician may use tools to try to pull or scrape out the seal that has been left behind which may cause some scratching, scoring, or other damage to the inside of the bore which may then lead to a loss of a positive seal in the subsequently installed filter and sealing ring. Another disadvantage to leaving behind a lip seal is that the repair technician may not realize it has been left behind and may simply insert a new filter with its own seal into the bore, causing a stack-up of sealing rings that could cause the new sealing ring not to be seated properly or the filter not to fit correctly in the transmission.

In view of the foregoing, it would be desirable to have an improved lip seal and sealing method for sealing around the outside of a neck that is inserted into a larger bore. It would be desirable if such as seal could at least to some extent enhance the retention of the seal on the neck when the seal is removed from the bore.

SUMMARY OF THE INVENTION

In some aspects of some embodiments of the present invention, an improved lip seal and sealing method is provided. It would be desirable to have an improved lip seal and sealing method for sealing around the outside of a neck that is inserted into a larger bore. It would be desirable if such as seal could at least to some extent enhance the retention of the seal on the neck when the seal is removed from the bore.

In accordance with one embodiment of the present invention, a lip seal for sealing between the outside surface of a neck and the inside surface of a bore, comprises; an elastomeric portion; and a spring element disposed within the elastomeric portion, with at least a portion of the element being angled with respect to a plane in which the seal lies.

In accordance with another embodiment of the present invention, a lip seal for sealing between the outside surface of a neck and the inside surface of a bore, comprises; an elastomeric position and spring means disposed within the elastomeric portion.

In accordance with yet another embodiment of the present invention, a method of sealing between the outside surface of a neck and the inside surface of a bore using a lip seal, comprises; providing a lip seal having an elastomeric portion and a spring element disposed within the elastomeric portion; and inserting the lip seal onto the neck.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
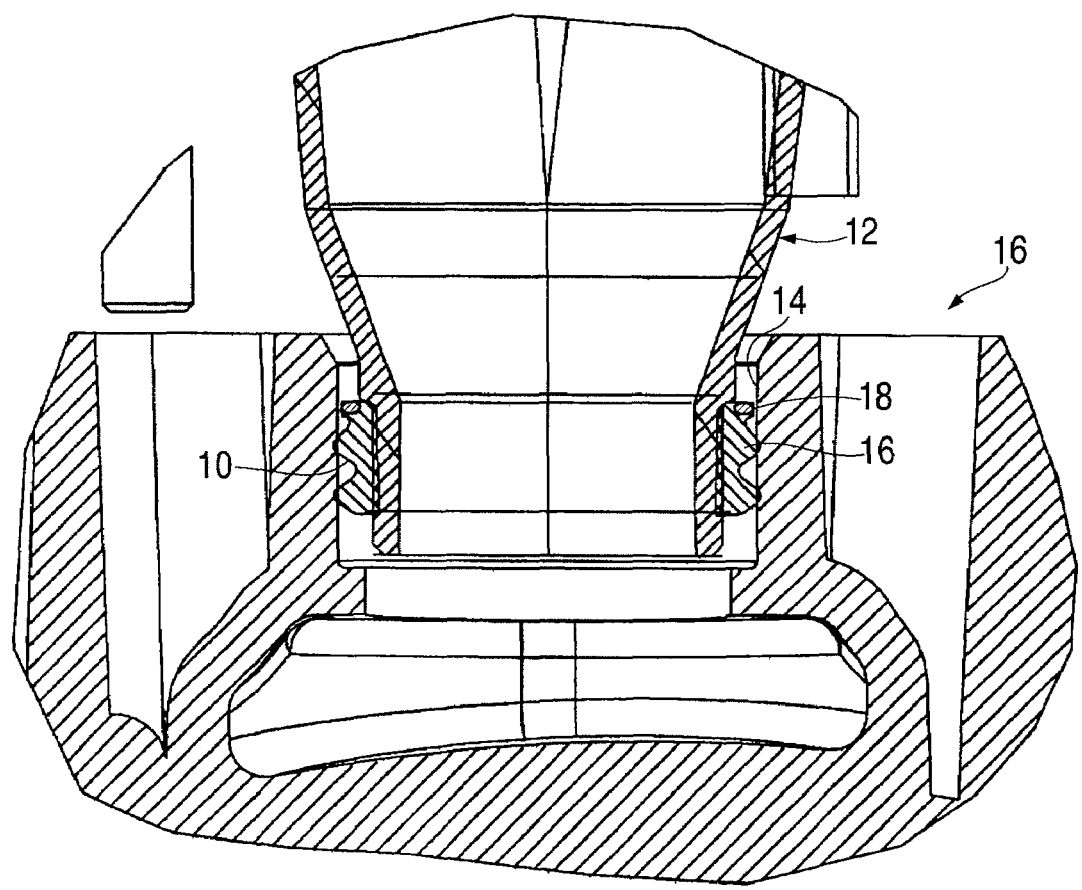
FIG. 1 is a cross-sectional view of a lip seal according to a preferred embodiment of the present invention in an installed state on a filter neck and in an operational orientation with respect to an inlet housing of a transmission component.
Figure 2:
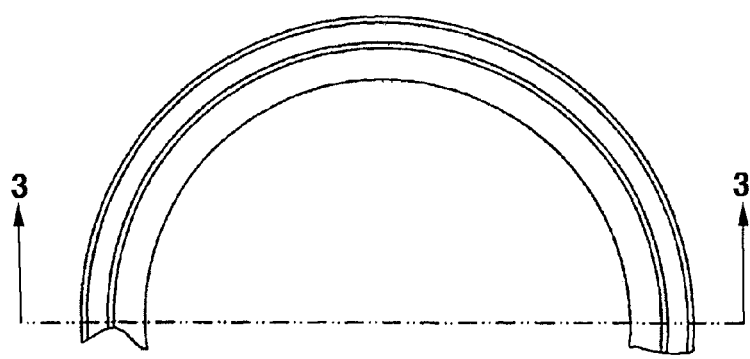
FIG. 2 is a cutaway top view of the lip seal shown in FIG. 1.
Figure 3:
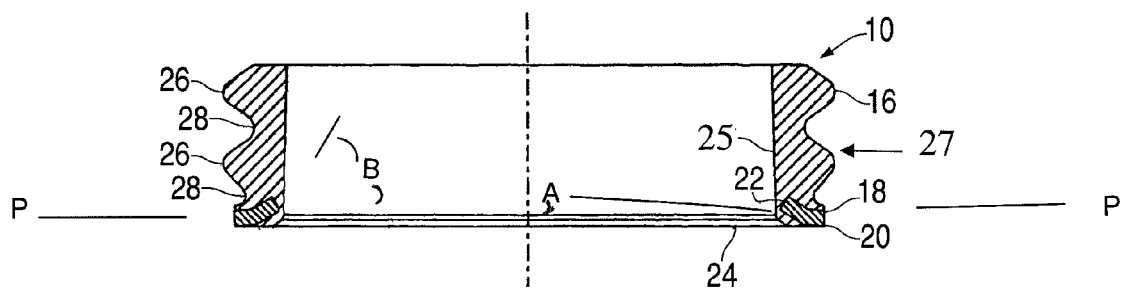
FIG. 3 is a cross-sectional view taken though line 3-3 of FIG. 2 of the lip seal.
Figure 4:
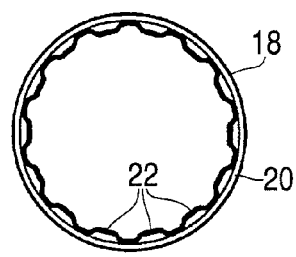
FIG. 4 is a top view of a washer element that is part of the lip seal shown in FIG. 3.
Figure 5:
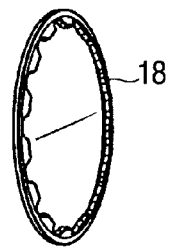
FIG. 5 is the perspective view of the washer element shown in FIG. 4.

In some embodiments of the present invention, an improved lip seal and sealing method is provided for sealing around the outside of a neck that is inserted into a larger bore. In some embodiments an element is added to the seal that at least to some extent enhances the retention of the seal on the neck when the seal is removed from the bore. Preferred embodiments of the invention will now be further described with reference to the drawing figures in which like reference numerals refer to like parts throughout.

FIG. 1 illustrates a lip seal 10 according to a preferred embodiment of the present invention. The lip seal 10 is shown in an installed configuration in a layout view. The lip seal 10 provides sealing between the outside of a neck 12 of a transmission filter and an inlet bore 14 of a transmission component 16. The neck 12 is typically an injection molded feature, which may be integral with an outer casing of a transmission or other fluid filter. The transmission component 16 may be a transmission casting, a valve body or a pump inlet, or another component of a transmission that utilizes fluid. Further, although transmission components and transmission filters are given as examples of applicability of the invention, the lip seal 10 may be utilized anywhere that a lip seal is desired to seal between the outer surface of a neck and an inner surface of a corresponding bore.

The lip seal 10 is also shown in a layout format view in FIG. 1. That is, the lip seal 10 is depicted in its relaxed geometry, and thus its edges appear to overlap with the neck and the inlet respectively. One skilled in the art will recognize that in the actual install state, the lip seal 10 will be compressed. The lip seal inner diameter will be expanded to fit around the neck, and its outer diameter will compressed to fit within the neck.

The lip seal 10 is generally composed of two parts: a resilient elastomeric part 17 and a more rigid washer element 18. These components are described in further detail below. The geometry and placement of the washer element 18 is within the elastomeric section 17 provides an overall lip seal 10 that is easy to insert onto the neck 12 (that is it has a relatively low insertion force so that it can manually or with a tool could be installed easily onto the neck 12 during manufacturing of the filter); and also provides a relatively low insertion force for the filter and the lip seal together being inserted into the bore 14. Furthermore, the provision of the washer element 18 additional provides the benefit that the force to remove the lip seal 10 from the neck 12 is relatively high. Thus, when the filter neck is removed or pulled out of the bore 14, the lip seal tends to stay in place on the neck 12 rather than sliding off the neck 12 and being left behind in the bore 14.

In some embodiments this "one-way" feature of the seal 10 may be accomplished to the extent that the seal is relatively easy to slide onto a neck, but is difficult or in some embodiments virtually impossible to slide off of the neck without destroying the seal.

Turning to FIGS. 2 through 5, the seal 10 will now be described in additional detail. The seal 10 includes an elastomeric polymer portion 17 which may be made of for example a polymer such as Viton or Vamac, or a high temperature rubber. The elastic portion 17 is generally over-molded onto the washer element 18. The washer element 18 may be made of any of a variety of materials, including for example spring steel. Other metals or rigid plastics may also be implemented.

Figure 6:
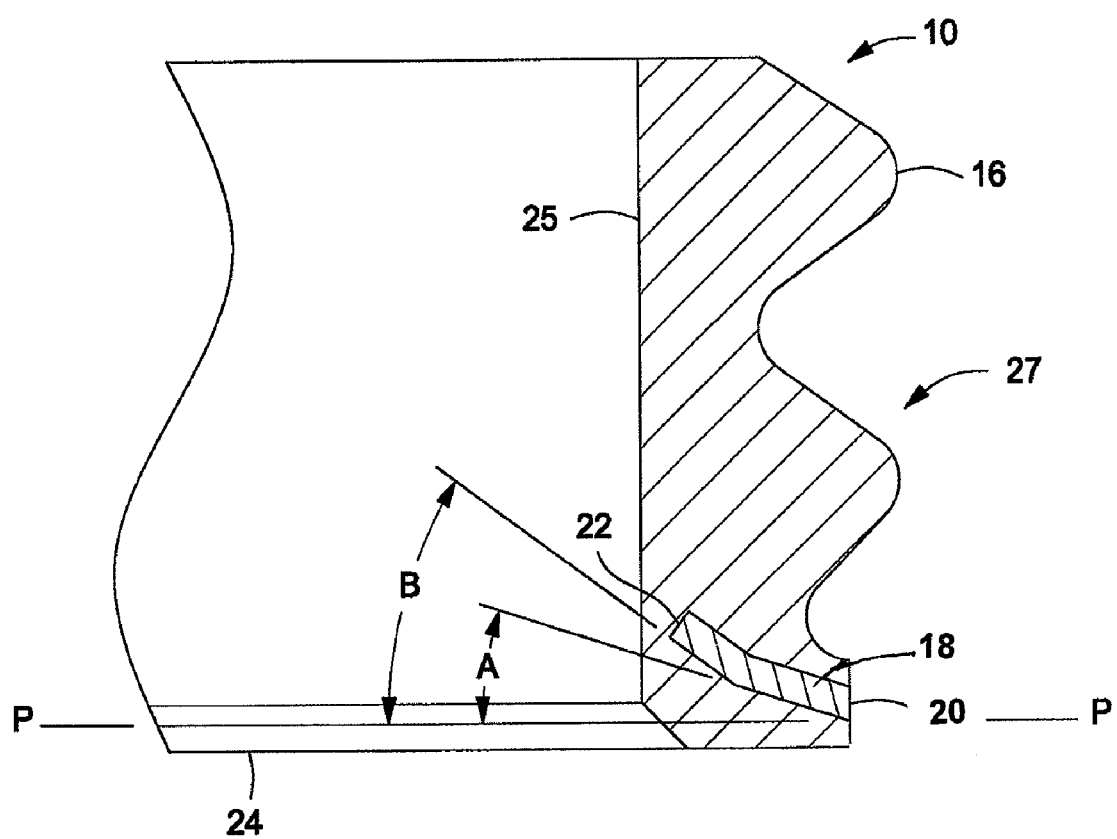
FIG. 6 is a detail view showing the washer element in cross-section similar to FIG. 3.

The washer element 18 may be configured generally in the profile of a Belleville washer, having inwardly protruding teeth. For example, the exemplary ring 18 has an outer ring section 20 which is canted upward slightly from horizontal, and a number of inwardly protruding fingers 22 which are canted upward at a greater angle with respect to horizontal. This geometry is similar to a Belleville washer and provides an internal spring characteristic. The angle A of the outer ring 20 with respect to horizontal plane P is generally selected to be between 10 and 15 degrees relative to horizontal plane P, but may encompass other angles. The upward angle B of the fingers 22 may be selected to be from 15 to 45 degrees relative to horizontal plane P, or may be any other angle. The fingers 22 and the outer ring 20 provide a toggling or jamming effect that resists removal of an installed seal 10 from the neck 12. That is, when the seal 10 is inserted over the neck 12, the fingers 22 tend to deflect outward and upward as needed in order to permit a low insertion force for sliding the seal 10 onto the neck 12. However, during removal of the filter, if the seal 10 tends to be tugged off of the neck 12, the friction gripping of the interior surface 25 of the seal 10 will tend to push downward on the fingers 22, which then deflect downward and radially inward, so that the seal 10 tends to grip more tightly onto the neck 12. As the axial pulling force increases, the tightening or locking or gripping force provided by the combination of the washer element 18 and the remainder of the seal 10 tends to hold the seal on the neck 12. FIG. 6 further shows the angles A and B. These angles are interior included angles which are taken between the angle of the portion of the washer and the plane in which the washer lies. The angles are minor angles (less than 90°) and are taken such that the angle faces inwards towards the central axis of the ring.

In this embodiment, the ring 18 has at least to some extent a Belleville washer shape, and more preferably such a shape with inwardly protruding teeth, that provides a seal with an overall low insertion force and high removal force. This permits other advantages with respect to design of the seal. In some embodiments in particular, the outer surface 27 of the seal 10 can include two or more outwardly protruding peaks 26 and valleys 28. In the installed state, the peaks 26 are compressed to provide sealing contact. Due to the resistance to seal removal off the neck that is provided by the washer element 18, the invention can provide some embodiments in which seals have greater degrees of protrusion of the peaks 26 (that is, the seal can be designed with a greater "void volume") than would be accomplished using an elastomeric seal that does not have the washer element 18. This is because having a high void volume without the washer element 18 may cause so much frictional contact with the inlet bore 14 that removal of the filter neck 12 would tend to leave behind the seal 10. However, by virtue of the washer element 18, a higher void volume can be accomplished if desired while still permitting removal of the seal 10 and the neck 12 together at the same time.

While the preferred washer element 18 is shown having a outer ring region having some angle relative to horizontal and a plurality of inwardly projecting finger regions at a second angle, other embodiments are not limited to this combination of this of angles. For example, a suitable Belleville type washer element 18 or other washer element 18, can include both an outer ring and inner fingers all having a common upward angle, or a outer ring having a generally flat horizontal configuration with inwardly and upwardly angled projecting fingers, or a conical ring section being provided instead of the fingers. Further, the washer element 18 does not need to be entirely circular, and instead could be provided by a series of arcuate sections spaced apart from each other.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A lip seal for sealing between the outside surface of a neck and the inside surface of a bore, the lip seal comprising:
    an elastomeric portion oriented to lie generally in a direction along a horizontal plane P comprising an interior surface and an outer surface, the interior surface having a uniform smooth surface, wherein the interior surface encircles the outside surface of the neck, the outer surface having
    a first peak and a first valley, and
    a second peak and a second valley, wherein the first and the second peaks compress to fit within the inside surface of the bore; and
    a spring element oriented to lie generally in the direction along the horizontal plane P and disposed within the elastomeric portion next to the second valley, with at least a portion of the element being angled with respect to the horizontal plane P, wherein the spring element is a ring shaped structure having an outer ring portion and a plurality of radially upwardly and inwardly directed finger portions, wherein the finger portions extend radially from the outer diameter toward the interior diameter wherein the outer spring portion lies at an interior included angle A less than 90° relative to the horizontal plane P and the finger portions lie at an interior included angle B less than 90° relative to the horizontal plane P, and wherein the interior included angle B less than 90° is greater than the interior included angle A less than 90°.

2. The seal of claim 1, wherein the element is in the shape of a Belleville washer.

3. The seal of claim 1, wherein the element is made of spring steel.

4. The seal according to claim 1, wherein the finger portions are angled with respect to the plane.

5. The seal according to claim 4, wherein the outer ring is angled with respect to the plane, and the finger portions are angled with respect to the outer ring.

6. A seal according to claim 1, wherein the elastomeric portion is over-molded onto the element.

7. The seal of claim 1, wherein the angle A is between 10 degrees and 15 degrees.

8. The seal of claim 7, wherein the angle B is between 15 degrees and 45 degrees.

9. The seal of claim 1, wherein the angle B is between 15 degrees and 45 degrees.

10. The seal of claim 1, wherein the spring element is substantially surrounded by the elastomeric portion.

11. A lip seal for sealing between the outside surface of a neck and the inside surface of a bore, the lip seal comprising:
    an elastomeric portion oriented to lie generally in a direction along a horizontal plane P comprising an interior surface and an outer surface, the interior surface having a uniform smooth surface, wherein the interior surface encircles the outside surface of the neck, the outer surface having
    a first peak and a first valley, and
    a second peak and a second valley, wherein the first and the second peaks compress to fit within the inside surface of the bore; and
    spring means oriented to lie generally in the direction along the horizontal plane P and disposed within the elastomeric portion next to the second valley, wherein the spring means is a ring like structure having an outer ring portion and a plurality of radially inwardly and upwardly directed finger portions, wherein the finger portions extend radially from the outer diameter toward the interior diameter wherein the outer spring portion lies at an interior included angle A less than 90° relative to the horizontal plane P and the finger portions lie at an interior included angle B less than 90° relative to the horizontal plane P, and wherein the interior included angle B less than 90° is greater than the interior included angle A less than 90°.

12. The seal of claim 11, wherein the spring means is in the shape of a Belleville washer.

13. The seal of claim 11, wherein the element is made of spring steel.

14. The seal according to claim 11, wherein the finger portions are angled with respect to a plane in which the seal lies.

15. The seal according to claim 14, wherein the outer ring is angled with respect to the plane, and the finger portions are angled with respect to the outer ring.

16. A seal according to claim 11, wherein the elastomeric portion is over-molded onto the spring means.

17. The seal of claim 11, wherein the angle A is between 10 degrees and 15 degrees.

18. The seal of claim 11, wherein the angle B is between 15 degrees and 45 degrees.

19. The seal of claim 18, wherein the angle B is between 15 degrees and 45 degrees.

20. The seal of claim 11, wherein the spring means is substantially surrounded by the elastomeric portion.

21. A method of sealing between the outside surface of a neck and the inside surface of a bore using a lip seal, comprising:

providing a lip seal having an elastomeric portion oriented to lie generally in a direction along a horizontal plane P and a spring element oriented to lie generally in the direction along the horizontal plane P and disposed within the elastomeric portion, wherein the elastomeric portion comprising an interior diameter and an outer diameter, the interior diameter having a uniform smooth surface, wherein the interior diameter encircles the outside surface of the neck, the outer diameter having a first peak and a first valley, and a second peak and a second valley, wherein the first and the second peaks compress to fit within the inside surface of the bore, wherein the spring element is disposed within the elastomeric portion next to the second valley, wherein the spring element is a ring like structure having an outer ring portion and a plurality of radially inwardly and upwardly directed finger portions, wherein the finger portions extend radially from the outer diameter toward the interior diameter wherein the outer spring portion lies at an interior included angle A less than 90° relative to the horizontal plane P and the finger portions lie at an interior included angle B less than 90° relative to the horizontal plane P, and wherein the interior included angle B less than 90° is greater than the interior included angle A less than 90°; and inserting the lip seal onto the neck.

22. The method of claim 21, wherein the element is in the shape of a Belleville washer.

23. The method of claim 21, wherein the element is made of spring steel.

24. The method according to claim 21, wherein the finger portions are angled with respect to a plane in which the seal lies.

25. The method according to claim 24, wherein the outer ring is angled with respect to the plane, and the finger portion are angled with respect to the outer ring.

26. A method according to claim 21, wherein the elastomeric portion is over-molded onto the ring element.

27. The seal of claim 21, wherein the angle A is between 10 degrees and 15 degrees.

28. The seal of claim 27, wherein the angle B is between 15 degrees and 45 degrees.

29. The seal of claim 21, wherein the angle B is between 15 degrees and 45 degrees.

30. The seal of claim 21, wherein the spring element is substantially surrounded by the elastomeric portion.

* * * * *